(12) United States Patent
Shiono

(10) Patent No.: US 6,624,231 B2
(45) Date of Patent: Sep. 23, 2003

(54) FLUORINATED HYDROSILYLATION-CURABLE ELASTOMER COMPOSITION

(75) Inventor: Mikio Shiono, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 10/046,173

(22) Filed: Jan. 16, 2002

(65) Prior Publication Data

US 2002/0132902 A1 Sep. 19, 2002

(30) Foreign Application Priority Data

Jan. 16, 2001 (JP) .......................... 2001-007237

(51) Int. Cl.$^7$ .................. C08G 77/12; C08G 77/22; C08L 83/16; C08L 83/05; C08K 3/34
(52) U.S. Cl. .................. 524/492; 428/405; 528/31; 528/34; 528/42; 528/15; 524/588; 525/431
(58) Field of Search .................. 428/405; 524/492, 524/588; 528/31, 34, 15, 42; 525/431

(56) References Cited

U.S. PATENT DOCUMENTS

| | | | | |
|---|---|---|---|---|
| 5,665,846 A | * | 9/1997 | Sato et al. | 528/15 |
| 5,705,586 A | * | 1/1998 | Sato et al. | 528/15 |
| 6,417,311 B1 | * | 7/2002 | Fukuda et al. | 528/42 |
| 6,517,946 B2 | * | 2/2003 | Shiono et al. | 428/450 |

FOREIGN PATENT DOCUMENTS

| | | |
|---|---|---|
| EP | 0765916 A2 | 4/1997 |
| EP | 0967251 A1 | 12/1999 |
| EP | 1 033 387 A2 | 9/2000 |
| EP | 1122284 A1 | 8/2001 |
| JP | 7-232399 A2 * | 9/1995 |

* cited by examiner

Primary Examiner—Robert Dawson
Assistant Examiner—Marc S. Zimmer
(74) Attorney, Agent, or Firm—Birch, Stewart, Kolasch & Birch, LLP

(57) ABSTRACT

A curable composition comprising (A) a fluorinated amide compound having alkenyl radicals, (B) a fluorinated organohydrogensiloxane having SiH radicals, (C) a platinum group compound, (D) a silica powder, (E) an organosilane or organosiloxane having a monovalent perfluorooxyalkyl or perfluoroalkyl, divalent perfluorooxyalkylene or perfluoroalkylene radical and a hydroxy and/or alkoxy radical, and (F) an organosilane or organosiloxane having an alkenyl radical, a monovalent perfluorooxyalkyl or perfluoroalkyl, divalent perfluorooxyalkylene or perfluoroalkylene radical, and a hydroxy and/or alkoxy radical cures into a fluorinated elastomer that has good solvent resistance, chemical resistance, heat resistance, low-temperature properties, mold release, water and oil repellency and weather resistance as well as significantly improved mechanical strength and compression set.

10 Claims, No Drawings

FLUORINATED HYDROSILYLATION-CURABLE ELASTOMER COMPOSITION

This invention relates to curable compositions which cure into parts having good solvent resistance, chemical resistance, heat resistance, low-temperature properties, mold release, water and oil repellency and weather resistance and more particularly, to curable compositions which cure into fluorinated elastomers having significantly improved mechanical strength and compression set as well as the foregoing properties and thus suitable as O-rings and sealing members.

BACKGROUND OF THE INVENTION

Curable fluorinated elastomer compositions utilizing addition reaction between alkenyl and hydrosilyl radicals are well known in the art. The applicant (assignee) previously proposed in Japanese Patent Application No. 11-53543 (U.S. Ser. No. 09/517,056 and EPA 00301722.5) to add microparticulate silica surface treated to be hydrophobic and having a specific surface area of at least 50 m$^2$/g to such a composition whereby a cured product is improved in mechanical strength and compression set. The composition can be cured by brief heating. The cured product has good solvent resistance, chemical resistance, heat resistance, low-temperature properties, mold release, water and oil repellency and weather resistance and is useful in sealing applications where such properties are required.

However, the composition of the preceding application has the problem that mechanical strength sometimes declines as compression set lowers. With respect to the compression set itself, there is still left room for improvement, as compared with other fluoro-rubbers. Automotive parts such as O-rings and diaphragms and semiconductor parts are required to have long-term reliability although the service conditions under which they are used become increasingly strict. It is thus strongly desired to improve the compression set.

SUMMARY OF THE INVENTION

An object of the invention is to provide a novel and improved curable composition which cures into a fluorinated elastomer that has good solvent resistance, chemical resistance, heat resistance, low-temperature properties, mold release, water and oil repellency and weather resistance as well as improved mechanical strength and compression set.

The present invention is predicated on the following discovery. It is directed to an addition reaction type curable composition based on (A) a fluorinated amide compound having at least two alkenyl radicals in a molecule, to which (B) a fluorinated organohydrogensiloxane is compounded as a crosslinker and chain extender, and (C) a platinum group compound is added as a curing catalyst. To the composition are added (D) silica powder as a reinforcing filler, and (E) a fluorinated organosilane or organosiloxane and (F) an alkenyl-bearing fluorinated organosilane or organosiloxane as a surface treating agent for the silica powder. The curable composition thus formulated cures into a fluorinated elastomer having good solvent resistance, chemical resistance, heat resistance, low-temperature properties, mold release, water and oil repellency and weather resistance as well as improved mechanical strength and compression set.

Specifically, the invention provides a curable composition comprising as essential components, (A) a fluorinated amide compound having at least two alkenyl radicals in a molecule, (B) a fluorinated organohydrogensiloxane having at least two hydrogen atoms attached to silicon atoms in a molecule, (C) a catalytic amount of a platinum group compound, (D) a silica powder having a BET specific surface area of at least 50 m$^2$/g, (E) an organosilane or organosiloxane having in a molecule at least one monovalent perfluorooxyalkyl, monovalent perfluoroalkyl, divalent perfluorooxyalkylene or divalent perfluoroalkylene radical and at least one hydroxy and/or alkoxy radical directly attached to a silicon atom, and (F) an organosilane or organosiloxane having in a molecule at least one alkenyl radical, at least one monovalent perfluorooxyalkyl, monovalent perfluoroalkyl, divalent perfluorooxyalkylene or divalent perfluoroalkylene radical, and at least one hydroxy and/or alkoxy radical directly attached to a silicon atom.

DESCRIPTION OF THE PREFERRED EMBODIMENT

Briefly stated, the curable composition of the invention contains (A) a fluorinated amide compound having at least two alkenyl radicals in a molecule as a base polymer, (B) a fluorinated organohydrogensiloxane as a crosslinker and chain extender, (C) a platinum group compound as a curing catalyst, (D) silica powder as a reinforcing filler, (E) a fluorinated organosilane or organosiloxane as a surface treating agent for the silica powder, and (F) an alkenyl radical-bearing fluorinated organosilane or organosiloxane as a surface treating agent for the silica powder and compression set reducing agent.

Component (A) is a fluorinated amide compound which should have at least two alkenyl radicals in a molecule, and preferably at least one alkenyl radical at each of opposite ends. In the compound, fluorine is preferably contained as a monovalent perfluorooxyalkyl, monovalent perfluoroalkyl, divalent perfluorooxyalkylene or divalent perfluoroalkylene radical. Preferably the compound has the following linkage.

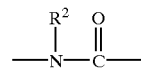

Herein R$^2$ is hydrogen or a substituted or unsubstituted monovalent hydrocarbon radical having 1 to 10 carbon atoms, especially 1 to 8 carbon atoms, and preferably free of aliphatic unsaturation.

Further, the compound may have the following linkage.

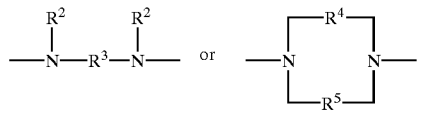

Herein R$^2$ is as defined above; R$^3$ is a substituted or unsubstituted divalent hydrocarbon radical which may be separated by at least one atom of oxygen, nitrogen and silicon atoms; R$^4$ and R$^5$ each are a substituted or unsubstituted divalent hydrocarbon radical.

The fluorinated amide compound (A) is preferably of the following general formula (1).

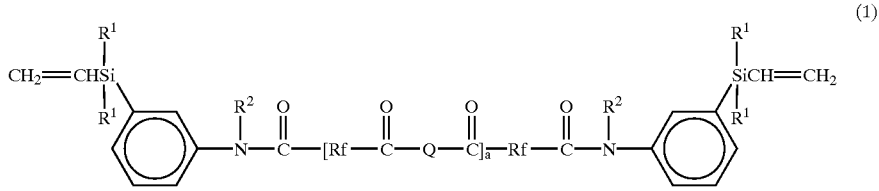

(1)

Referring to formula (1), $R^1$ stands for substituted or unsubstituted monovalent hydrocarbon radicals preferably of 1 to 10 carbon atoms, more preferably 1 to 8 carbon atoms, and also preferably free of aliphatic unsaturation. Examples include alkyl radicals such as methyl, ethyl, propyl, isopropyl, butyl, isobutyl, tert-butyl, pentyl, hexyl, octyl and decyl; cycloalkyl radicals such as cyclopentyl, cyclohexyl and cycloheptyl; alkenyl radicals such as vinyl, allyl, propenyl, isopropenyl, butenyl, and hexenyl; aryl radicals such as phenyl, tolyl, xylyl and naphthyl; aralkyl radicals such as benzyl, phenylethyl and phenylpropyl; and substituted ones of these radicals in which some or all of the hydrogen atoms are replaced by halogen atoms or the like, typically fluorinated alkyl radicals such as chloromethyl, chloropropyl, bromoethyl, 3,3,3-trifluoropropyl, and 6,6,6, 5,5,4,4,3,3-nonafluorohexyl.

$R^2$ stands for hydrogen or substituted or unsubstituted monovalent hydrocarbon radicals preferably of 1 to 10 carbon atoms, more preferably 1 to 8 carbon atoms, and also preferably free of aliphatic unsaturation, as defined above for $R^1$. Examples of the monovalent hydrocarbon radicals are as exemplified above for $R^1$, for example, alkyl radicals such as methyl, ethyl, propyl, and isopropyl; cycloalkyl radicals such as cyclohexyl; alkenyl radicals such as vinyl and allyl; aryl radicals such as phenyl and tolyl; and substituted ones of these radicals in which some hydrogen atoms are replaced by halogen atoms or the like, typically fluorinated alkyl radicals such as chloromethyl, chloropropyl, 3,3,3-trifluoropropyl, and 6,6,6,5,5,4,4,3,3-nonafluorohexyl.

Q is a radical of the following general formula (2) or (3).

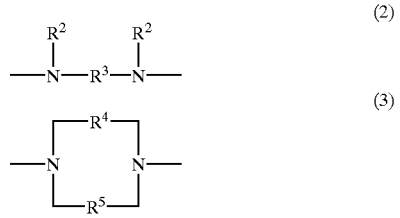

$R^2$ in formula (2) is as defined above. $R^3$ may be selected from substituted or unsubstituted divalent hydrocarbon radicals, preferably from divalent hydrocarbon radical of 1 to 20 carbon atoms, especially 2 to 10 carbon atoms. Examples include alkylene radicals such as methylene, ethylene, propylene, methylethylene, butylene and hexamethylene; cycloalkylene radicals such as cyclohexylene; arylene radicals such as phenylene, tolylene, xylylene, naphthylene and biphenylene; substituted ones of these radicals in which some hydrogen atoms are replaced by halogen atoms or the like; and combinations of these substituted or unsubstituted alkylene and arylene radicals.

$R^3$ may contain one or more atoms of oxygen, nitrogen and silicon atoms at an intermediate of its linkage. In this case, the oxygen atom intervenes in the linkage of $R^3$ in the form of —O—. The nitrogen atom intervenes in the linkage of $R^3$ in the form of —NR'— wherein R' is hydrogen, alkyl of 1 to 8 carbon atoms, especially 1 to 6 carbon atoms or aryl. The silicon atom intervenes in the linkage of $R^3$ in the form of a straight or cyclic organosiloxane-containing radical or organosilylene radical as shown below.

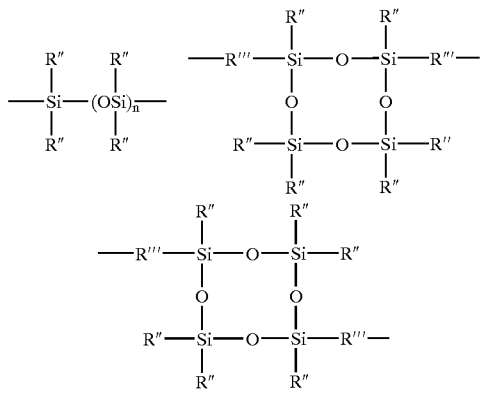

Herein, R" is an alkyl radical of 1 to 8 carbon atoms or aryl radical as exemplified for $R^1$ and $R^2$, R'" is an alkylene radical of 1 to 6 carbon atoms or arylene radical as exemplified for $R^3$, and n is an integer of 0 to 10, especially 0 to 5.

Examples of these radicals are given below.

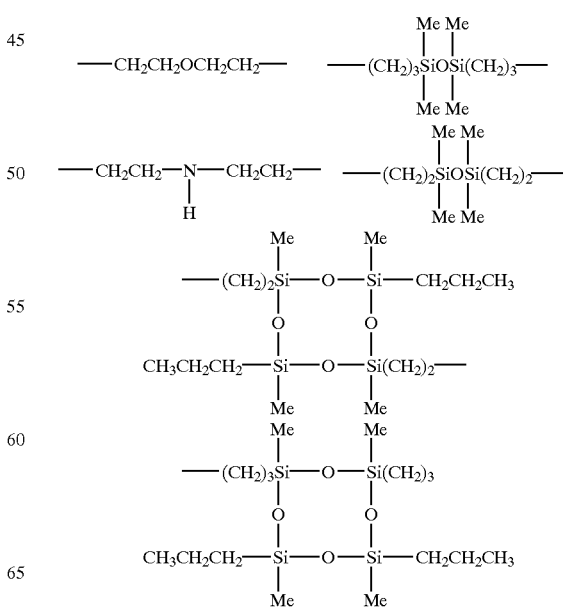

-continued

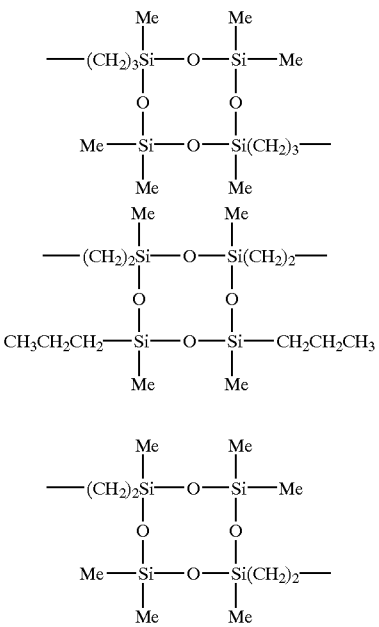

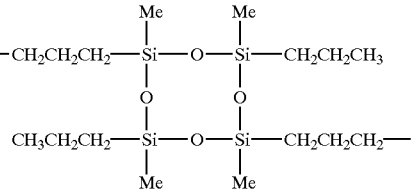

In the above formulae, Me is methyl.

In formula (3), $R^4$ and $R^5$ are substituted or unsubstituted divalent hydrocarbon radicals of 1 to 10 carbon atoms, especially 2 to 6 carbon atoms. Illustrative are alkylene radicals such as methylene, ethylene, propylene, methylethylene, butylene, and hexamethylene, cycloalkylene radicals such as cyclohexylene, and substituted ones of these radicals in which some of the hydrogen atoms are replaced by halogen atoms.

The radicals Q in formula (1), represented by formula (2) or (3), are exemplified below. In the following chemical formulae, Me is methyl, Ph is phenyl, and X is hydrogen, methyl or phenyl.

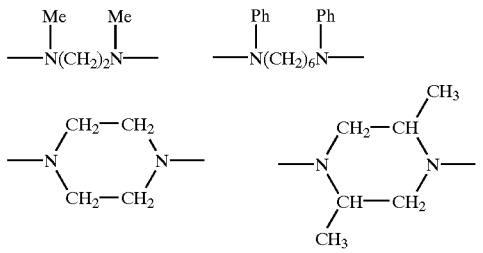

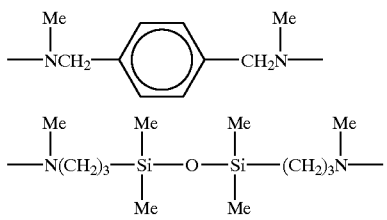

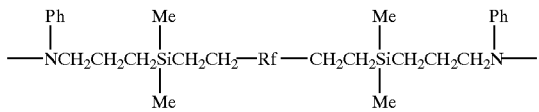

(Rf is as defined above.)

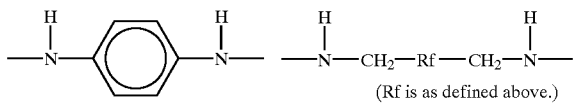

(Rf is as defined above.)

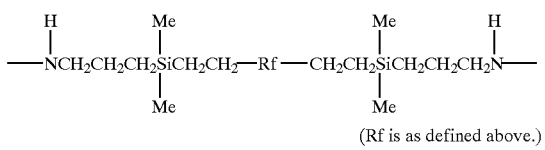

(Rf is as defined above.)

-continued

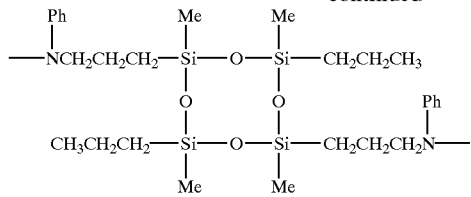

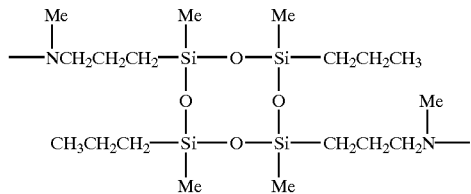

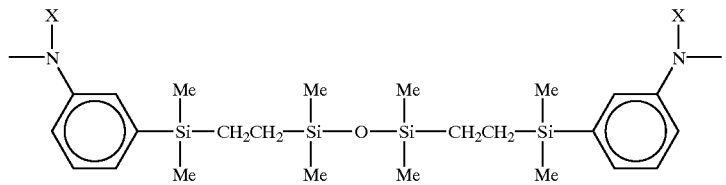

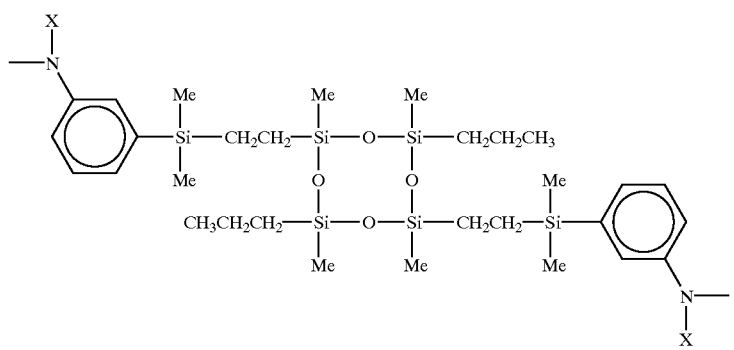

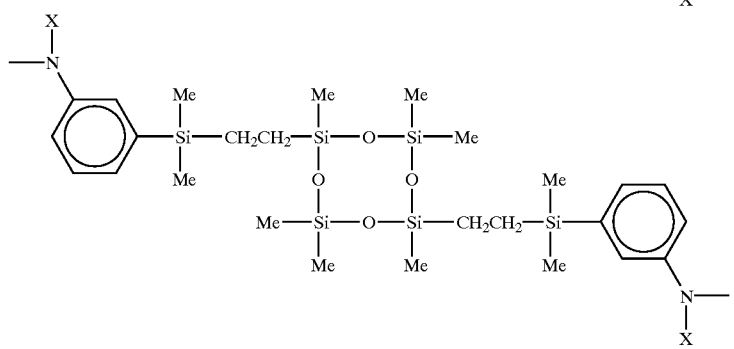

In formula (1), Rf is a divalent perfluoroalkylene radical or divalent perfluoropolyether radical. The preferred divalent perfluoroalkylene radical is represented by $-C_mF_{2m}-$ wherein m is 1 to 10, preferably 2 to 6. The preferred divalent perfluoropolyether radical is represented by the following formulae:

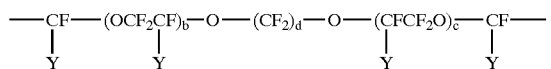

wherein Y is F or $CF_3$ radical, b, c and d are integers satisfying $b \geq 1$, $c \geq 1$, $2 \leq b+c \leq 200$, especially $2 \leq b+c \leq 110$, and $1 \leq d \leq 6$;

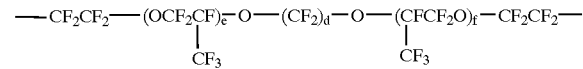

wherein d, e and f are integers satisfying $1 \leq d \leq 6$, $e \geq 0$, $f \geq 0$, and $0 \leq e+f \leq 200$, especially $2 \leq e+f \leq 110$;

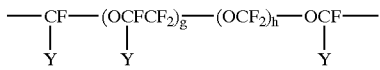

wherein Y is F or $CF_3$ radical, g and h are integers satisfying $1 \leq g \leq 20$ and $1 \leq h \leq 20$;

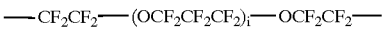

wherein i is an integer of 1 to 100.

Illustrative examples of Rf are given below.

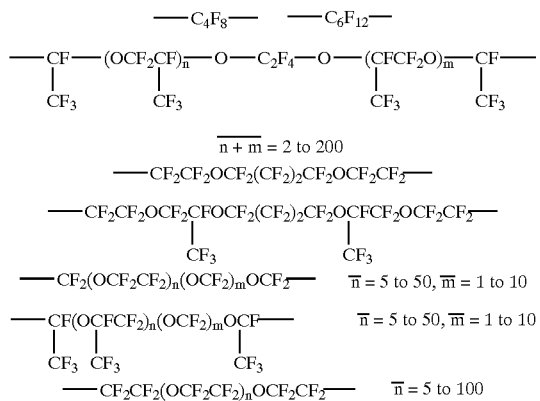

In formula (1), letter "a" is an integer inclusive of 0, which indicates that the fluorinated amide compound of formula (1) contains at least one divalent perfluoroalkylene radical or divalent perfluoropolyether radical in a molecule. Preferably, "a" is an integer of 0 to 10, and more preferably 1 to 6.

The fluorinated amide compound (A) used herein may range from a low viscosity polymer having a viscosity of about several tens of centistokes at 25° C. to a solid gum-like polymer. From the standpoint of ease of handling, a gum-like polymer is suited for use as heat vulcanizable rubber, and a polymer having a viscosity of about 100 to 100,000 centistokes at 25° C. is suited for use as liquid rubber. With too low a viscosity, the resulting cured elastomer may be short in elongation and fail to provide a good profile of physical properties.

The fluorinated amide compound of formula (1) can be prepared by the following method. For example, a fluorinated amide compound of formula (1) wherein "a"=0 can be synthesized, for example, by reacting a compound having acid fluoride radicals at both ends represented by the general formula (4) with a primary or secondary amine compound represented by the general formula (5) in the presence of an acid acceptor such as trimethylamine.

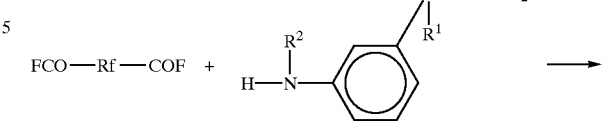

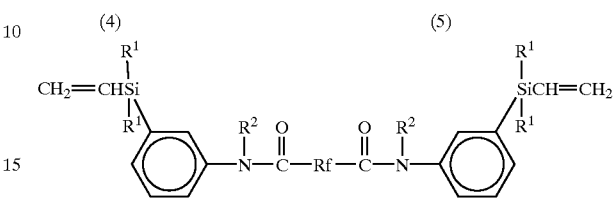

Herein, $R^1$, $R^2$ and Rf are as defined above.

Further, a fluorinated amide compound of formula (1) wherein "a" is an integer of at least 1 can be synthesized, for example, by reacting a compound having acid fluoride radicals at both ends represented by formula (4) with a diamine compound represented by the general formula (6):

$$H—Q—H \quad (6)$$

wherein Q is as defined above, in the presence of an acid acceptor, followed by reaction with a primary or secondary amine compound of formula (5).

In the former procedure, the relative amounts of the compound having acid fluoride radicals at both ends of formula (4) and the primary or secondary amine compound of formula (5) charged are not critical. Preferably the amount (a) of the compound of formula (4) and the amount (b) of the compound of formula (5) charged are adjusted such that the molar ratio of (a)/(b) may range from 0.1/1 to 1.2/1 mol/mol, and especially from 0.2/1 to 0.5/1 mol/mol.

In the latter procedure, the amount (a) of the compound of formula (4) and the amount (c) of the compound of formula (6) charged are not critical as long as the molar amount (a) is not smaller than the molar amount (c). The recurring units (a) in formula (1) may be set to an appropriate value for a particular purpose by adjusting the is molar ratio of (a)/(c). With greater settings of (a)/(c), polymers having a relatively low molecular weight can be synthesized. With setting of (a)/(c) approximate to unity (1), polymers having a relatively high molecular weight can be synthesized.

Reaction conditions are not critical although the preferred conditions include 20 to 100° C. and 1 to 8 hours, and more preferably 20 to 50° C. and 2 to 4 hours.

It is noted that the fluorinated amide compound of formula (1) wherein Q is a linkage having an intervening silicon atom can be synthesized, for example, by first effecting reaction as mentioned above using an amine compound of formula (5) as the primary or secondary amine compound having an aliphatic unsaturated radical such as vinyl or allyl, thereby forming a both end vinyl-terminated compound of the following general formula (7), then reacting the compound of formula (7) with an organosiloxane compound having two hydrosilyl radicals in a molecule, as represented by the following general formula (8), in the presence of an addition reaction catalyst.

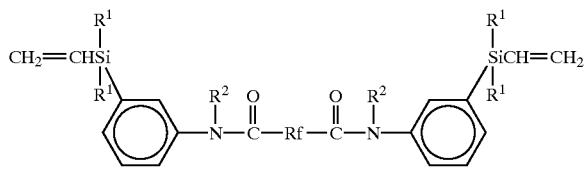
(7)

Herein $R^1$, $R^2$ and Rf are as defined above.

 (8)

Herein P is a divalent organic radical having a siloxane linkage, illustrative examples of which are given below.

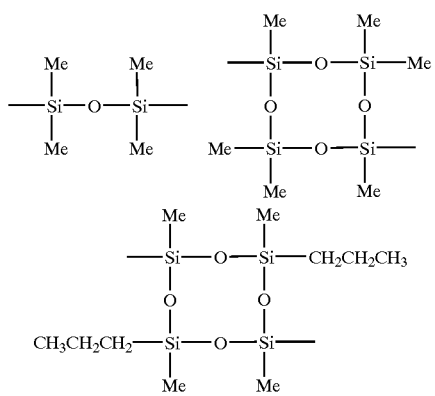

In this reaction, the relative amounts of the both end vinyl-terminated compound of formula (7) and the compound of formula (8) charged should be such that the molar amount (d) of the compound (7) charged be greater than the molar amount (e) of the compound (8) charged. The ratio of (d)/(e) is at most 2. That is, 1<(d)/(e)≦2. With greater settings of (d)/(e), polymers having a relatively low molecular weight can be synthesized. With setting of (d)/(e) approximate to unity (1), polymers having a relatively high molecular weight can be synthesized.

The catalyst used herein may be selected from elements of Group VIII in the Periodic Table and compounds thereof, for example, chloroplatinic acid, alcohol-modified chloroplatinic acid (see U.S. Pat. No. 3,220,972), complexes of chloroplatinic acid with olefins (see U.S. Pat. Nos. 3,159,601, 3,159,662 and 3,775,452), platinum black and palladium on such carriers as alumina, silica and carbon, rhodium-olefin complexes, and chlorotris(triphenylphosphine)rhodium (known as Wilkinson catalyst). Such a catalyst may be used in a catalytic amount. The above-described complexes are preferably used as solutions in alcohol, ketone, ether and hydrocarbon solvents.

The preferred reaction conditions include 50 to 150° C., more preferably 80 to 120° C. and 2 to 4 hours.

Component (B) is a fluorinated organohydrogensiloxane having at least two hydrogen atoms attached to silicon atoms in a molecule. It serves as a crosslinker and chain extender for the fluorinated amide compound (A). The fluorinated organohydrogensiloxane should preferably have at least one monovalent perfluorooxyalkyl, monovalent perfluoroalkyl, divalent perfluorooxyalkylene or divalent perfluoroalkylene radical, and at least two, more preferably at least three hydrosilyl radicals (i.e., SiH radicals) in a molecule.

The perfluorooxyalkyl, perfluoroalkyl, perfluorooxyalkylene and perfluoroalkylene radicals are typically represented by the following general formulae.

Monovalent Perfluoroalkyl Radical:

$C_mF_{2m+1}$— wherein m is an integer of 1 to 20, and preferably 2 to 10.

Divalent Perfluoroalkylene Radical:

—$CF_mF_{2m}$— wherein m is an integer of 1 to 20, and preferably 2 to 10.

Monovalent Perfluorooxyalkyl Radical:

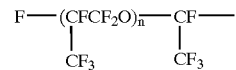

wherein n is an integer of 1 to 5.

Divalent Perfluorooxyalkylene Radical:

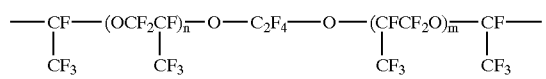

wherein an average of m+n is an integer of 2 to 100.

The fluorinated organohydrogensiloxane may be cyclic or chain-like or even three-dimensional network. Especially preferred are fluorinated organohydrogensiloxanes having in the molecule at least one monovalent organic radical containing a perfluoroalkyl, perfluoroalkyl ether or perfluoroalkylene, as shown below, as a monovalent substituent attached to a silicon atom.

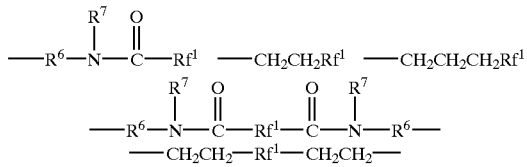

In the above formulae, $R^6$ stands for divalent hydrocarbon radicals of 1 to 10 carbon atoms, and especially 2 to 6 carbon atoms, for example, alkylene radicals such as methylene, ethylene, propylene, methylethylene, tetramethylene and hexamethylene, and arylene radicals such as phenylene. $R^7$ stands for hydrogen or monovalent hydrocarbon radicals of 1 to 8 carbon atoms, and especially 1 to 6 carbon atoms as described for $R^2$. $Rf^1$ stands for monovalent perfluoroalkyl, monovalent perfluorooxyalkyl, divalent perfluorooxyalkylene or divalent perfluoroalkylene radicals as described above.

In addition to the monovalent organic radical containing a mono or di-valent fluorinated substituent, i.e., a perfluoroalkyl, perfluorooxyalkyl, perfluorooxyalkylene or perfluoroalkylene radical, the fluorinated organohydrogensiloxane (B) has a monovalent substituent attached to a silicon atom, which is typically selected from aliphatic unsaturation-free monovalent hydrocarbon radicals of 1 to 10 carbon atoms, and especially 1 to 8 carbon atoms, as described for $R^2$.

In the fluorinated organohydrogensiloxane, the number of silicon atoms in a molecule is usually about 2 to 60, preferably about 4 to 30 though not limited thereto.

Examples of the fluorinated organohydrogensiloxane are given below. They may be used alone or in admixture of two or more. Note that Me is methyl and Ph is phenyl.

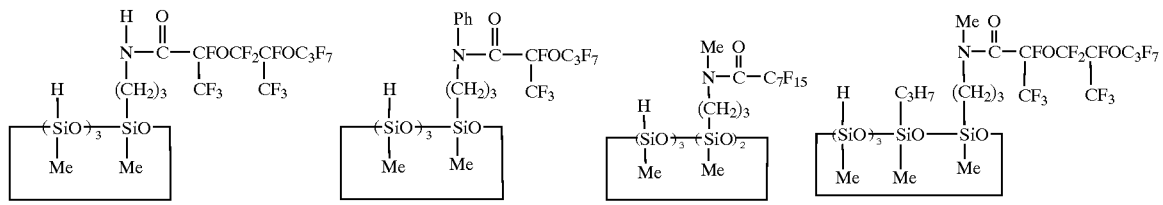
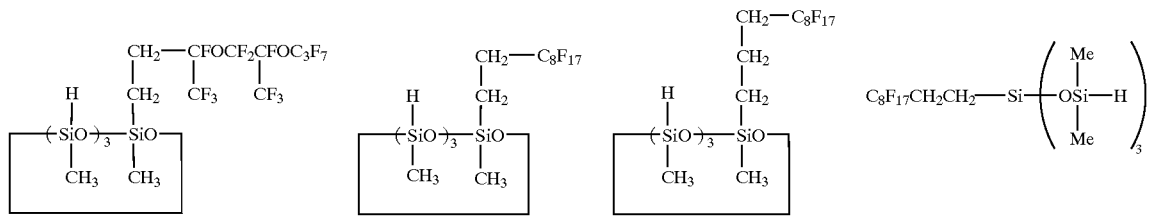
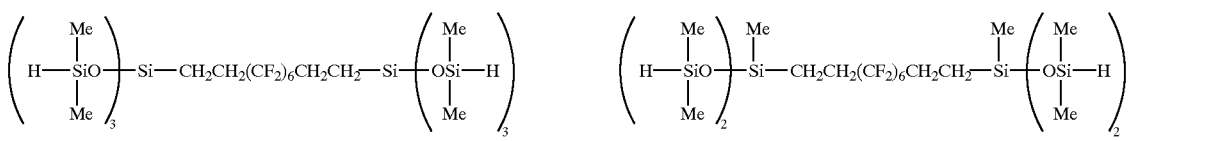
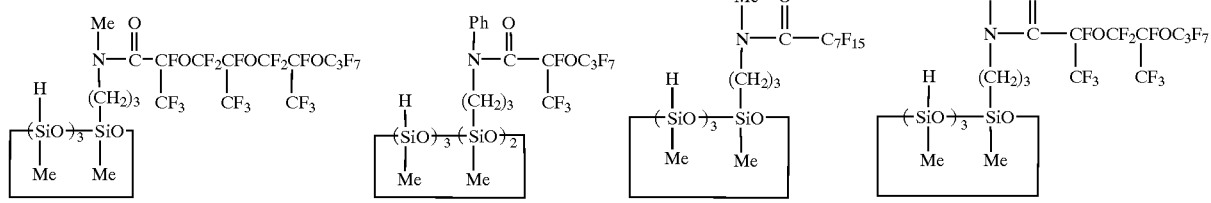
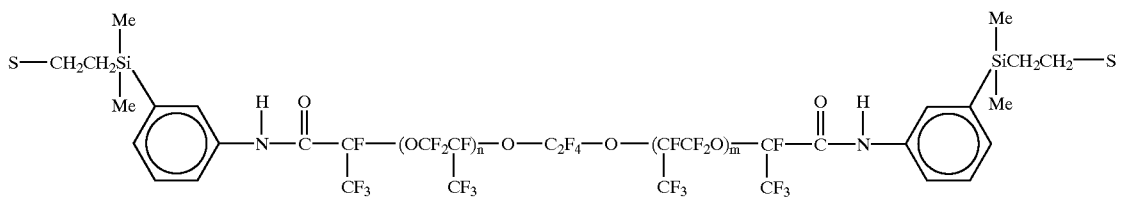
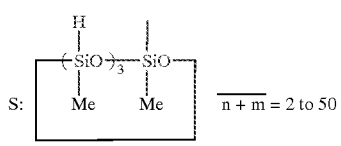
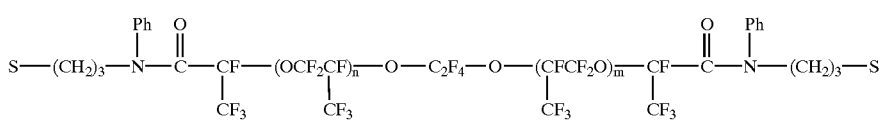
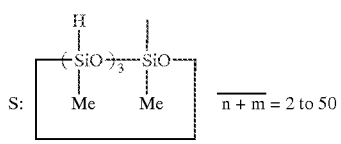
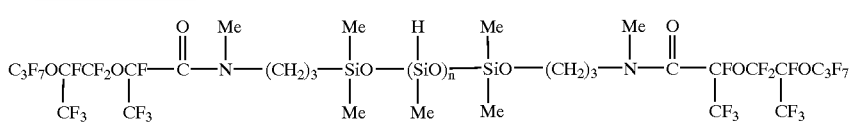

-continued

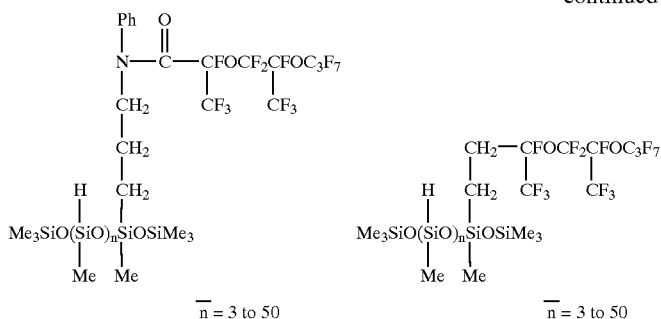

n = 3 to 50    n = 3 to 50

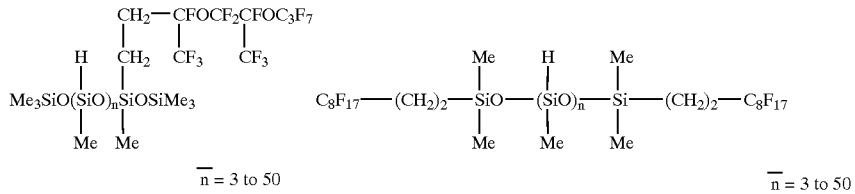

n = 3 to 50

If the fluorinated organohydrogensiloxane (B) used is compatible with the fluorinated amide compound (A), then the curable composition will cure into a uniform product.

Component (B) is preferably used in such amounts that 0.5 to 5 mol, more preferably 1 to 2 mol of hydrosilyl radicals (i.e., SiH radicals) are available per mol of aliphatic unsaturated radicals such as alkenyl (e.g., vinyl and allyl) and cycloalkenyl radicals in the entire composition. Amounts of component (B) giving less than 0.5 mol of SiH radicals may achieve an insufficient degree of crosslinking. With excessive amounts of component (B) giving more than 5 mol of SiH radicals, chain extension may become preferential, resulting in undercure, foaming, heat resistance decline and/or compression set decline. More illustratively, about 0.1 to 50 parts by weight of component (B) is preferably blended with 100 parts by weight of component (A).

Component (C) of the inventive composition is a platinum group compound for promoting addition reaction or hydrosilylation between the fluorinated amide compound (A) and the fluorinated organohydrogensiloxane (B), that is, a curing promoter. These compounds are generally noble metal compounds which are expensive, and therefore, platinum compounds which are relatively easily available are often employed.

The platinum compounds include, for example, chloroplatinic acid, complexes of chloroplatinic acid with olefins such as ethylene, complexes of chloroplatinic acid with alcohols and vinylsiloxanes, and platinum on silica, alumina or carbon, though are not limited thereto. Known examples of the platinum group compounds other than the platinum compound are rhodium, ruthenium, iridium and palladium compounds, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$.

The catalyst may be used as such if it is a solid catalyst. However, to obtain a more uniform cured product, it is recommended that a solution of chloroplatinic acid or a complex thereof in a suitable solvent be admixed with the fluorinated amide compound (A) in a miscible manner.

The amount of the catalyst used is not critical and a catalytic amount may provide a desired cure rate. From the economical standpoint and to obtain a satisfactory cured product, the preferred amount of the catalyst is about 1 to 1,000 parts by weight, more preferably about 10 to 500 parts by weight of platinum group metal per million parts by weight of the entire composition.

Component (D) is a silica powder having a BET specific surface area of at least 50 m$^2$/g, which serves to impart adequate physical strength to the cured composition. The silica powder (D) is available in the form of silica microparticulates well known as the silicone rubber filler. Exemplary species include fumed silica, precipitated silica and colloidal silica, with the fumed silica being most preferred.

The silica powder should have a BET specific surface area of at least 50 m$^2$/g, and especially 100 to 400 m$^2$/g. A surface area of less than 50 m$^2$/g fails to attain the objects of the invention.

Preferably the silica powder has been surface treated with various organochlorosilanes, organodisilazanes, cyclic organopolysilazanes, etc.

An appropriate amount of component (D) added is 5 to 60 parts, and preferably 10 to 40 parts by weight per 100 parts by weight of component (A). Less amounts of component (D) may fail to achieve sufficient reinforcement. More than 60 parts of component (D) may obstruct the flow of the composition and adversely affect the physical strength of cured products.

Component (E) is a fluorinated organosilane or fluorinated organosiloxane which serves as a surface treating agent for the silica powder (D). The fluorinated organosilane or fluorinated organosiloxane (E) is added when a mixture of the fluorinated amide compound (A) and the silica powder (D) is heated and kneaded in a mixer such as a kneader. If desired, at this point, the silica powder is heat treated, with a small amount of water being added, whereby surface silanol on the silica powder is treated. The heat treatment is effected at a temperature in the range of 100 to 200° C. This treatment renders the silica powder more miscible with the other components so that the composition is restrained from a "crepe hardening" phenomenon during storage and improved in flow.

The fluorinated organosilane or fluorinated organosiloxane (E) is an organosilane or organosiloxane having in a molecule at least one monovalent perfluorooxyalkyl, monovalent perfluoroalkyl, divalent perfluorooxyalkylene or divalent perfluoroalkylene radical and at least one hydroxy and/or alkoxy radical directly attached to a silicon atom (the alkoxy radical being preferably alkoxy of 1 to 6 carbon atoms, especially 1 to 4 carbon atoms). The molecular structure is not critical. The perfluorooxyalkyl, perfluoroalkyl, perfluorooxyalkylene and perfluoroalkylene radicals are typically represented by the following general formulae.

Monovalent Perfluoroalkyl Radical:

$C_mF_{2m+1}$— wherein m is an integer of 1 to 20, and preferably 2 to 10.

Divalent Perfluoroalkylene Radical:

—$CF_mF_{2m}$— wherein m is an integer of 1 to 20, and preferably 2 to 10.

Monovalent Perfluorooxyalkyl Radical:

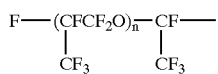

wherein n is an integer of 1 to 50.
Divalent Perfluorooxyalkylene Radical:

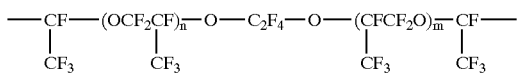

wherein an average of m+n is an integer of 2 to 100.

In particular, the monovalent substituent radical attached to a silicon atom is a radical having at least one monovalent organic radical containing a perfluoroalkyl, perfluoroalkyl ether or perfluoroalkylene, as shown below.

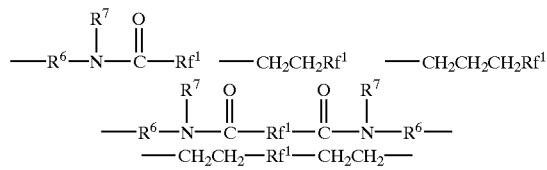

Herein $R^6$, $R^7$ and $Rf^1$ are as defined above.

In addition to the mono- or divalent fluorinated substituent radicals (i.e., perfluorooxyalkyl, perfluoroalkyl, perfluorooxyalkylene or perfluoroalkylene radicals) and the hydroxy and/or alkoxy radical directly attached to a silicon atom, the fluorinated organosilane or fluorinated organosiloxane (E) usually has monovalent substituent radicals attached to silicon atoms, examples of which are monovalent hydrocarbon radicals of 1 to 10 carbon atoms, especially 1 to 8 carbon atoms and free of aliphatic unsaturation as enumerated above for $R^1$.

In the fluorinated organosilane or fluorinated organosiloxane (E), the number of silicon atoms included in the molecule thereof, though not limited thereto, is typically 1 or 2 in the case of fluorinated organosilanes and 2 to 20, preferably 3 to 10 in the case of fluorinated organosiloxanes.

These compounds are prepared by effecting hydrosilylation, hydrolytic or appropriate reaction on an organic fluorine compound having an alkenyl radical (e.g., allyl and vinyl) and a monovalent perfluorooxyalkyl, monovalent perfluoroalkyl, divalent perfluorooxyalkylene or divalent perfluoroalkylene radical in a well-known manner.

Examples of the fluorinated organosilane or fluorinated organosiloxane (E) are given below. They may be used alone or in admixture of two or more. In the following chemical formulae, Me is methyl.

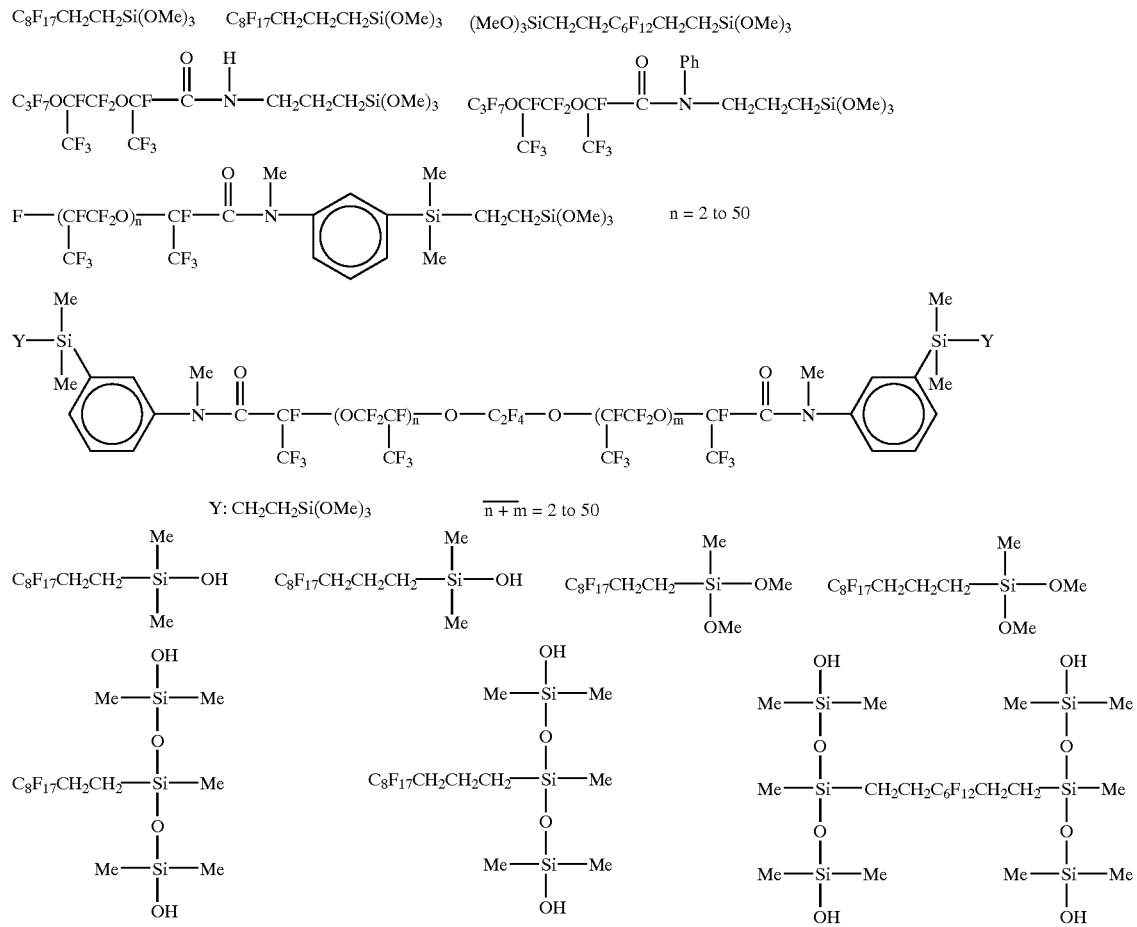

An appropriate amount of component (E) used is about 1 to 40 parts, more preferably about 1 to 30 parts by weight per 100 parts by weight of the silica powder (D). Less than 1 part of component (E) may be insufficient to make the treatment effective. More than 30 parts of component (E) may inhibit cure and adversely affect the physical properties of the cured product.

Component (F) is an alkenyl radical-bearing fluorinated organosilane or fluorinated organosiloxane, which serves not only as a surface treating agent for the silica powder (D), but also as an improver for reducing the compression set of the cured product of the composition and enhancing the physical strength thereof. The fluorinated organosilane or fluorinated organosiloxane (F) is added when a mixture of the fluorinated amide compound (A) and the silica powder (D) is heated and kneaded in a mixer such as a kneader and at the same time as is component (E).

The fluorinated organosilane or fluorinated organosiloxane (F) is an organosilane or organosiloxane having in a molecule (1) at least one alkenyl radical, (2) at least one monovalent perfluorooxyalkyl, monovalent perfluoroalkyl, divalent perfluorooxyalkylene or divalent perfluoroalkylene radical, and (3) at least one hydroxy and/or alkoxy radical directly attached to a silicon atom (the alkoxy radical being preferably alkoxy of 1 to 6 carbon atoms, especially 1 to 4 carbon atoms). The molecular structure is not critical. Examples of the alkenyl radical include those of 2 to 6 carbon atoms, and especially vinyl and allyl. Vinyl is most preferred. The perfluorooxyalkyl, perfluoroalkyl, perfluorooxyalkylene and perfluoroalkylene radicals are typically represented by the following general formulae.

Monovalent Perfluoroalkyl Radical:

$C_mF_{2m+1}$— wherein m is an integer of 1 to 20, and preferably 2 to 10.

Divalent Perfluoroalkylene Radical:

—$C_mF_{2m}$— wherein m is an integer of 1 to 20, and preferably 2 to 10.

Monovalent Perfluorooxyalkyl Radical:

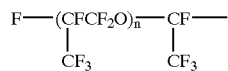

wherein n is an integer of 1 to 5.

Divalent Perfluorooxyalkylene Radical:

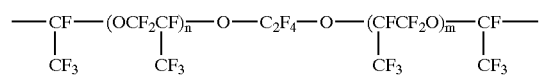

wherein an average of m+n is an integer of 2 to 100.

In particular, the monovalent substituent radical attached to a silicon atom is a radical having at least one monovalent organic radical containing a perfluoroalkyl, perfluoroalkyl ether or perfluoroalkylene, as shown below.

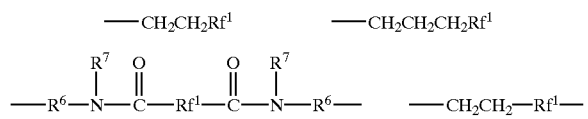

Herein $R^6$, $R^7$ and $Rf^1$ are as defined above.

In addition to the mono- or divalent fluorinated substituent radicals (i.e., perfluorooxyalkyl, perfluoroalkyl, perfluorooxyalkylene or perfluoroalkylene radicals) and the hydroxy and/or alkoxy radical directly attached to a silicon atom, the fluorinated organosilane or fluorinated organosiloxane (F) usually has monovalent substituent radicals attached to silicon atoms, examples of which are alkenyl radicals and monovalent hydrocarbon radicals of 1 to 10 carbon atoms, especially 1 to 8 carbon atoms and free of aliphatic unsaturation as enumerated above for $R^1$.

In the fluorinated organosilane or fluorinated organosiloxane (F), the number of silicon atoms included in the molecule thereof, though not limited thereto, is typically 1 or 2 in the case of fluorinated organosilanes and 2 to 20, preferably 3 to 10 in the case of fluorinated organosiloxanes.

These compounds are prepared by effecting hydrosilylation reaction on an organic fluorine compound having an alkenyl radical (e.g., allyl and vinyl) and a monovalent perfluorooxyalkyl, monovalent perfluoroalkyl, divalent perfluorooxyalkylene or divalent perfluoroalkylene radical in a well-known manner, optionally followed by Grignard reaction, hydrolytic or appropriate reaction.

Examples of the fluorinated organosilane or fluorinated organosiloxane (F) are given below. They may be used alone or in admixture of two or more. In the following chemical formulae, Me is methyl.

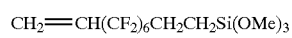    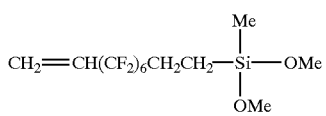

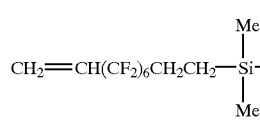    
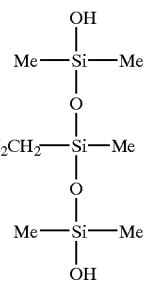
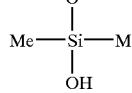

-continued

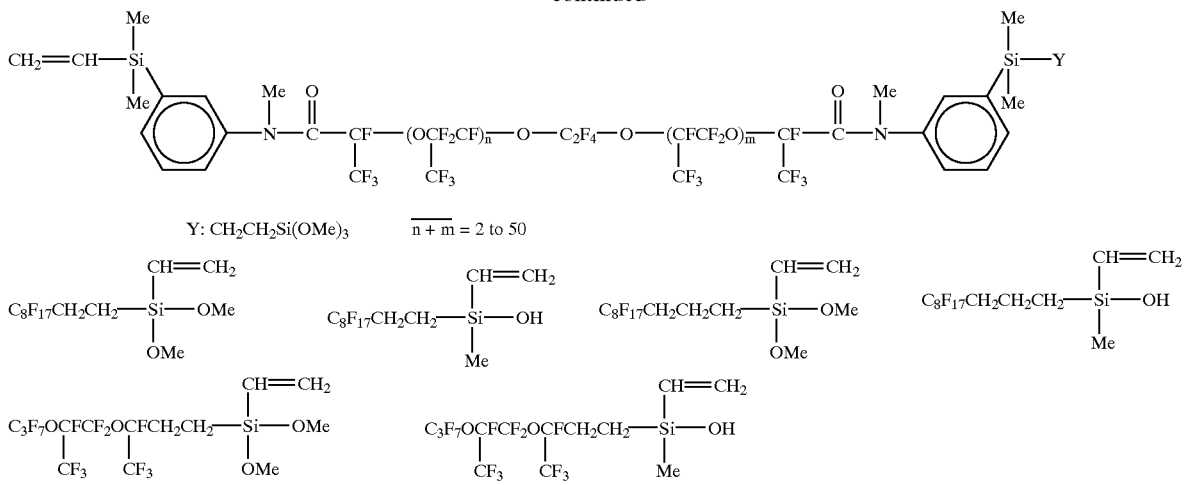

Y: CH₂CH₂Si(OMe)₃    $\overline{n+m} = 2$ to 50

An appropriate amount of component (F) used is about 0.1 to 10 parts, more preferably about 0.1 to 6 parts by weight per 100 parts by weight of the silica powder (D) and up to 20% by weight of components (E) and (F) combined. Less than 0.1 part of component (F) may fail to provide satisfactory compression set property. More than 10 parts of component (F) may inhibit cure and adversely affect the physical properties of the cured product.

It is noted that the amount of component (B) blended is determined in conjunction with the amounts of the fluorinated amide compound (A) and the fluorinated organosilane or fluorinated organosiloxane (F) and preferably such that 0.5 to 5 mol of SiH radicals may be present per mol of aliphatic unsaturated radicals (e.g., vinyl, allyl, cycloalkenyl) in the composition.

In addition to the above-mentioned essential components, various additives may be optionally added to the inventive curable composition for enhancing the practical utility thereof. Typical additives include reaction controlling agents, for example, acetylene compounds (e.g., acetylenic alcohols and silylated acetylenic alcohols), olefinic siloxanes and ethylenically unsaturated isocyanurates, and preferably acetylene compounds having the aforementioned monovalent fluorinated substituent radicals in a molecule, olefinic siloxanes and ethylenically unsaturated isocyanurates; semi-reinforcing fillers such as quartz flour, fused quartz powder, diatomaceous earth and calcium carbonate; inorganic pigments such as titanium oxide, iron oxide, carbon black, and cobalt aluminate; heat resistance modifiers such as titanium oxide, iron oxide, carbon black, cerium oxide, cerium hydroxide, zinc carbonate, magnesium carbonate, and manganese carbonate; heat conductive agents such as alumina, boron nitride, silicon carbide and powdered metals; and electroconductive agents such as carbon black, powdered silver and conductive zinc white. In addition, non-functional perfluoropolyethers and/or fluorinated amide compounds of general formula (9) below may be added as plasticizers, viscosity modifiers and flexibility-imparting agents.

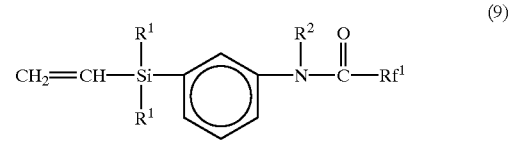

(9)

In formula (9), $R^1$, $R^2$ and $Rf^1$ are as defined above.

The above additives may be added in any suitable amount, insofar as the objects of the invention are attainable.

The curable composition of the invention may be prepared by intimately mixing components (A) to (F) and optional components in a suitable mixer such as a kneader, three-roll mill or planetary mixer. In order that the silica powder (D) be surface treated with a mixture of the fluorinated organosilane or organosiloxane (E) and the alkenyl radical-bearing fluorinated organosilane or organosiloxane (F), it is recommended to simultaneously add the fluorinated organosilane or organosiloxane (E) and the alkenyl radical-bearing fluorinated organosilane or organosiloxane (F) to a mixture of the fluorinated amide compound (A) and the silica powder (D), heat treat the resulting mixture in a mixer such as a kneader, then add the remaining components to the mixture and intimately mix them in a suitable mixer such as a three-roll mill or planetary mixer. The composition thus obtained is curable at room temperature. However, it is recommended to heat the composition in order to promote cure. In order to acquire satisfactory compression set property, the composition is preferably cured by heating at a temperature of 60° C. or higher, especially 100 to 200° C. for 10 minutes to 24 hours.

On use of the curable composition of the invention, it may be dissolved in a suitable fluorochemical solvent such as m-xylene hexafluoride or fluorinate to an appropriate concentration depending on a particular application and purpose.

EXAMPLE

Examples of the invention are given below by way of illustration and not by way of limitation. All parts are by weight, viscosity is a measurement at 25° C., and Me is methyl.

Example 1

A kneader was charged with 100 parts of a polymer of formula (10) below (viscosity 10,000 mPa·s, number average molecular weight 17,000, vinyl content 0.012 mol/100 g), to which 5 parts of a fluorinated organosilane of formula (11) below and 0.4 part of a fluorinated organosilane of formula (12) below were added, followed by 10 minutes of mixing. Then 40 parts of fumed silica (BET specific surface area 245 m²/g) surface treated with dimethyldichlorosilane was added in four equally divided portions. After the entire amount of silica was added, the mixture was kneaded for 1 hour without heating. With kneading continued, the unit was heated until an internal temperature of 150° C. was reached. The contents were heat treated for 2 hours while maintaining at 150 to 170° C. Then 100 parts of the polymer of formula (10) wad added to the contents, which were mixed until uniform. The contents were cooled below 40° C. and passed two times through a three-roll mill, obtaining a base compound.

A planetary mixer was charged with 120 parts of the base compound, to which were successively added 0.20 part of a toluene solution of platinum-divinyltetramethyldisiloxane complex (platinum concentration 0.5 wt %), 0.30 part of a 50% toluene solution of ethynylcyclohexanol, and 2.72 parts of fluorinated organohydrogensiloxane of formula (13) below. The ingredients were mixed until uniform and thereafter, degassed in a vacuum of 60 mmHg, yielding the final composition.

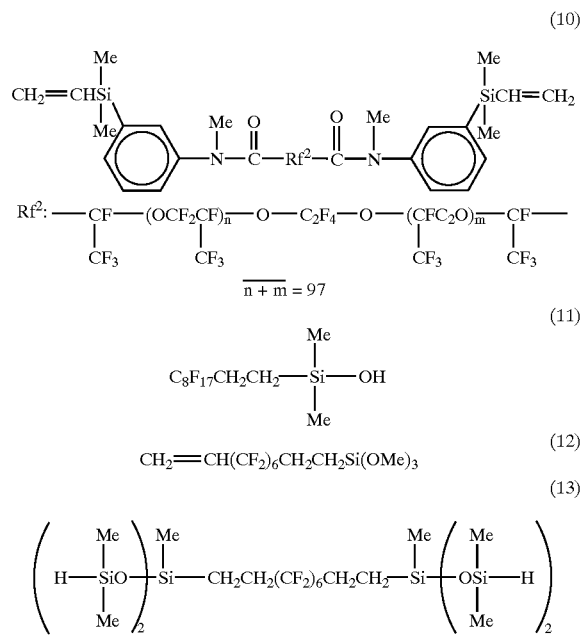

The composition was then press-cured at 150° C. for 10 minutes and oven-cured at 200° C. for 4 hours, thereby giving a cured sheet of 2 mm thick and a set ball for compression set measurement as prescribed by JIS K-6249. The physical properties and compression set of these test pieces were measured according to JIS K-6249. The results are shown in Table 1.

Example 2

A curable composition and cured products were prepared by the same formulation and procedure as in Example 1 except that 0.5 part of a fluorinated organosilane of formula (14) below was used instead of 0.4 part of the fluorinated organosilane of formula (12). The physical properties and compression set of the test pieces were measured, with the results shown in Table 1.

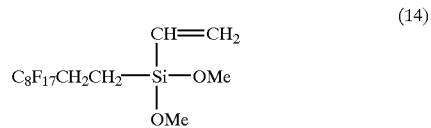

Example 3

A curable composition and cured products were prepared by the same formulation and procedure as in Example 1 except that fumed silica (BET specific surface area 190 m²/g) surface treated with hexamethylcyclotrisilazane was used instead of the fumed silica (BET specific surface area 245 m²/g), and the amount of the fluorinated organosilane of formula (11) and the fluorinated organosilane of formula (12) were changed to 4 parts and 0.3 part, respectively. The physical properties and compression set of the test pieces were measured, with the results shown in Table 1.

Example 4

A curable composition and cured products were prepared by the same formulation and procedure as in Example 3 except that 0.4 part of the fluorinated organosilane of formula (14) was used instead of 0.3 part of the fluorinated organosilane of formula (12). The physical properties and compression set of the test pieces were measured, with the results shown in Table 1.

Comparative Example 1

A curable composition and cured products were prepared by the same formulation and procedure as in Example 1 except that 5 parts of the fluorinated organosilane of formula (11) and 0.4 part of the fluorinated organosilane of formula (12) were omitted. The physical properties and compression set of the test pieces were measured, with the results shown in Table 1.

Comparative Example 2

A curable composition and cured products were prepared by the same formulation and procedure as in Example 1 except that 0.4 part of the fluorinated organosilane of formula (12) was omitted. The physical properties and compression set of the test pieces were measured, with the results shown in Table 1.

TABLE 1

| Properties | Example | | | | Comparative Example | |
|---|---|---|---|---|---|---|
| | 1 | 2 | 3 | 4 | 1 | 2 |
| Hardness | 65 | 63 | 63 | 64 | 65 | 60 |
| Tensile strength, MPa | 9.9 | 10.0 | 9.5 | 9.8 | 8.8 | 8.4 |
| Elongation at break, % | 270 | 280 | 260 | 290 | 200 | 270 |
| Tear strength, kN/m | 22 | 24 | 23 | 25 | 13 | 17 |
| Compression set, % | 10 | 9 | 9 | 8 | 30 | 20 |

Note:
compression set measured at 200° C., 24 hours

The curable compositions of the invention cure into products or fluorinated elastomers which have good solvent resistance, chemical resistance, heat resistance, low-temperature properties, mold release, water and oil repellency, and weather resistance as well as significantly improved mechanical strength and compression set. Thus the compositions are useful in a wider variety of molding applications and suitable for use as O-rings and other sealing members.

Japanese Patent Application No. 2001-007237 is incorporated herein by reference.

Reasonable modifications and variations are possible from the foregoing disclosure without departing from either the spirit or scope of the present invention as defined by the claims.

What is claimed is:

1. A curable composition comprising as essential components,
    (A) a fluorinated amide compound having at least two alkenyl radicals in a molecule,
    (B) a fluorinated organohydrogensiloxane having at least two hydrogen atoms attached to silicon atoms in a molecule,
    (C) a catalytic amount of a platinum group compound,
    (D) a silica powder having a BET specific surface area of at least 50 m$^2$/g,
    (E) an organosilane or organosiloxane having in a molecule at least one monovalent perfluorooxyalkyl, monovalent perfluoroalkyl, divalent perfluorooxyalkylene or divalent perfluoroalkylene radical and at least one hydroxy and/or alkoxy radical directly attached to a silicon atom, and
    (F) an organosilane or organosiloxane having in a molecule at least one alkenyl radical, at least one monovalent perfluorooxyalkyl, monovalent perfluoroalkyl, divalent perfluorooxyalkylene or divalent perfluoroalkylene radical, and at least one hydroxy and/or alkoxy radical directly attached to a silicon atom.

2. The curable composition of claim 1 wherein the fluorinated amide compound (A) is of the following general formula (1):

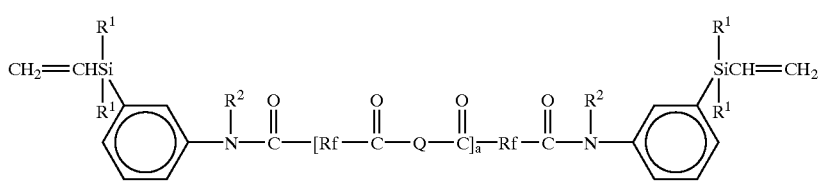

wherein $R^1$ is a substituted or unsubstituted monovalent hydrocarbon radical, $R^2$ is hydrogen or a substituted or unsubstituted monovalent hydrocarbon radical, Q is a radical of the following general formula (2) or (3):

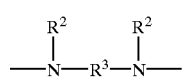

wherein $R^3$ is a substituted or unsubstituted divalent hydrocarbon radical which may be separated by at least one atom of oxygen, nitrogen and silicon atoms, and $R^2$ is as defined above,

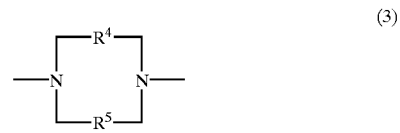

wherein $R^4$ and $R^5$ each are a substituted or unsubstituted divalent hydrocarbon radical, Rf is a divalent perfluoroalkylene or perfluoropolyether radical, and "a" is an integer of at least 0.

3. The curable composition of claim 1 wherein the fluorinated organohydrogensiloxane (B) has at least one monovalent perfluorooxyalkyl, monovalent perfluoroalkyl, divalent perfluorooxyalkylene or divalent perfluoroalkylene radical and at least two hydrogen atoms attached to silicon atoms in a molecule.

4. The curable composition of claim 1, wherein the catalyst (C) is in the form of a solution of chloroplatinic acid or a complex thereof.

5. The curable composition of claim 1, wherein the silica powder (D) has a BET specific surface area of 100 to 400 m$^2$/g.

6. The curable composition of claim 1, wherein in component (E) the number of silicon atoms in the fluorinated organosilanes is 1 or 2 and the number of silicon atoms in the fluorinated organosiloxanes is 2 to 20.

7. The curable composition of claim 1, wherein in component (F) the number of silicon atoms in the alkenyl-group-containing fluorinated organosilanes is 1 or 2 and the number of silicon atoms in the alkenyl-group-containing fluorinated organosiloxanes is 2 to 20.

8. The curable composition of claim 1, wherein the composition comprises 0.1 to 50 parts by weight of component (B) per 100 parts by weight of component (A).

9. The curable composition of claim 1, wherein the composition comprises 5 to 60 parts by weight of component (D) per 100 parts by weight of component (A).

10. The curable composition of claim 1, wherein the composition comprises 1 to 40 parts by weight of component (E) per 100 parts by weight of component (A).

* * * * *